(No Model.)   2 Sheets—Sheet 1.
G. F. HENSEL.
ROPE PORTIÈRE.
No. 534,828.   Patented Feb. 26, 1895.
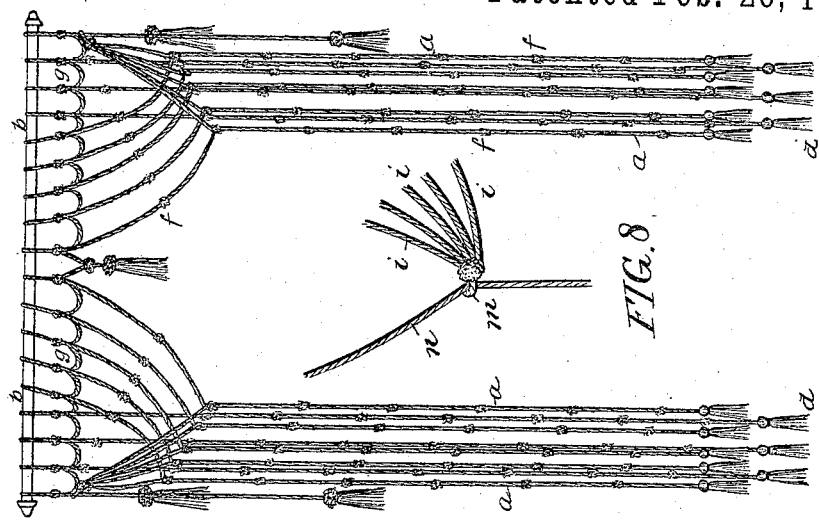
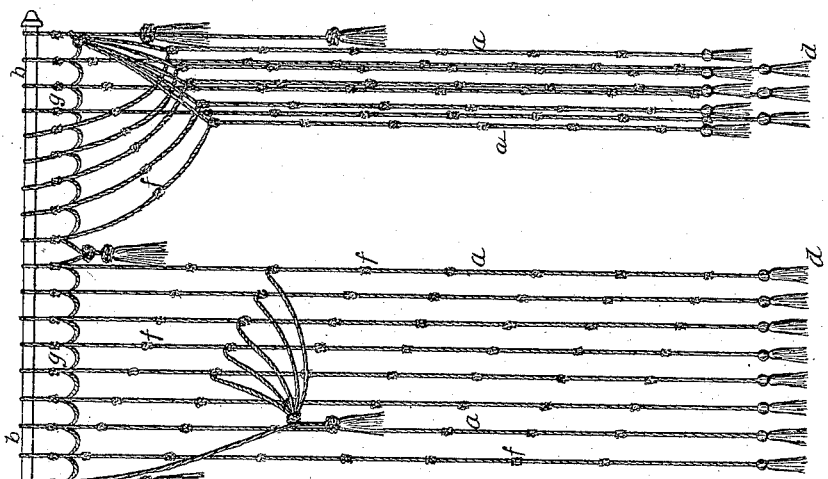
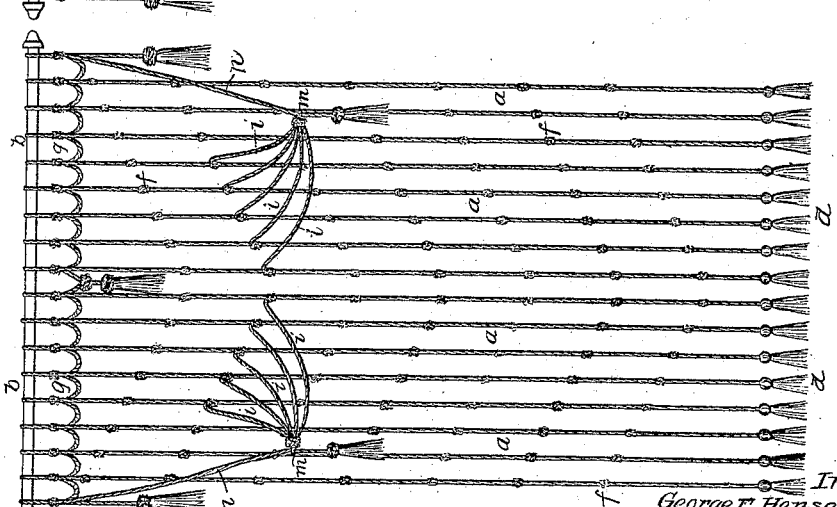

(No Model.)
2 Sheets—Sheet 2.
G. F. HENSEL.
ROPE PORTIÈRE.
No. 534,828.
Patented Feb. 26, 1895.
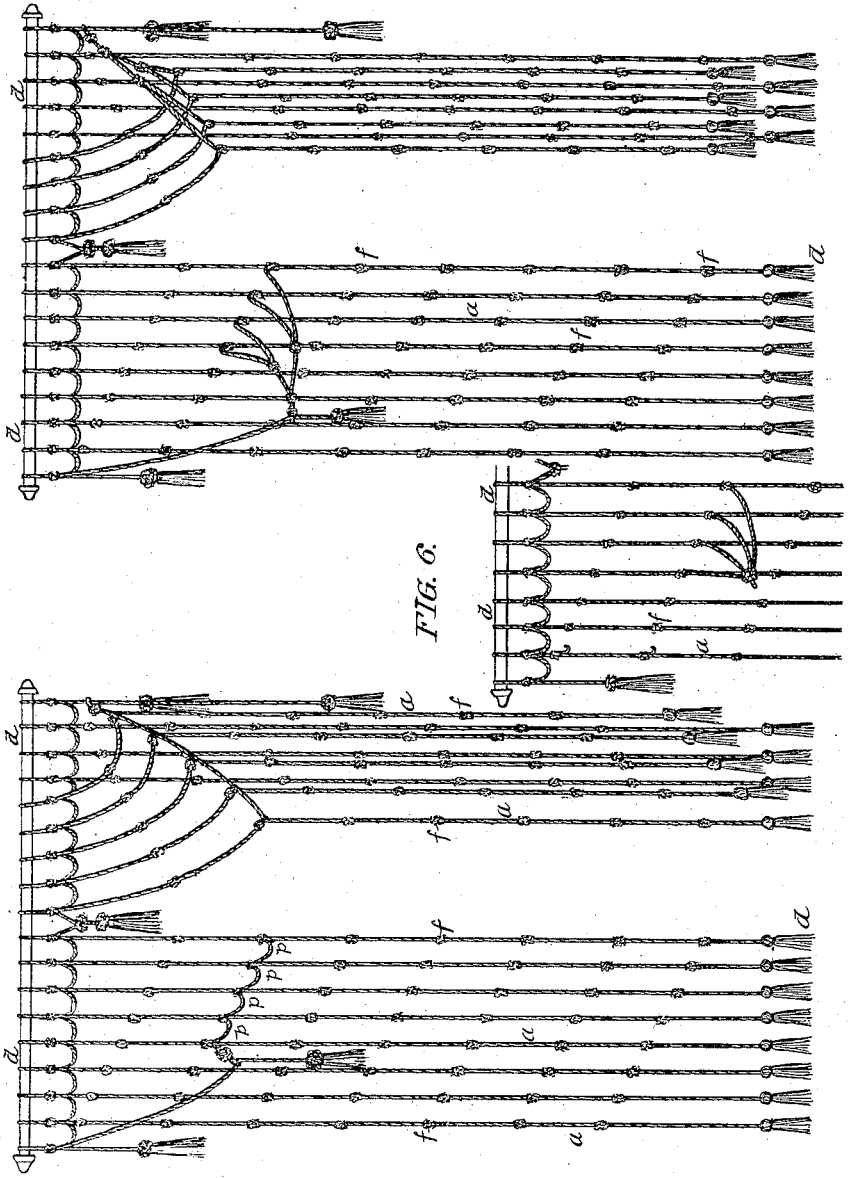
Witnesses:
R. Schleicher
Frank E. Bechtold
Inventor:
George F. Hensel
by his Attorneys
Howson & Howson

UNITED STATES PATENT OFFICE.

GEORGE F. HENSEL, OF PHILADELPHIA, PENNSYLVANIA.

ROPE PORTIÈRE.

SPECIFICATION forming part of Letters Patent No. 534,828, dated February 26, 1895.

Application filed October 3, 1894. Serial No. 524,802. (No model.)

*To all whom it may concern:*

Be it known that I, GEORGE F. HENSEL, a citizen of the United States, residing in Philadelphia, Pennsylvania, have invented certain Improvements in Rope Portières, of which the following is a specification.

The object of my invention is to so construct a rope portière as to provide for the graceful draping of the same and also to insure a pleasing effect when the portière is closed, an object which I attain in the manner hereinafter set forth, reference being had to the accompanying drawings, in which—

Figure 1, is a view of my improved rope portière showing the same closed. Fig. 2, is a view of the same showing one-half of the portière drawn to one side. Fig. 3, is a view showing both sides of the portière drawn back; and Figs. 4, 5, 6 and 7, are views illustrating modifications of the invention. Fig. 8 is an enlarged detail of the eye and loops connected thereto.

The portière consists of pendent ropes or cords *a* suspended from the usual rod or bar *b*, said ropes or cords terminating by preference at their lower ends in tassels or other ornaments *d* and having at intervals throughout their length knots, protuberances, or rosettes *f*, the portière also having in most cases at the top a heading *g* of any appropriate character, that shown in the drawings consisting of a looped cord with tassel pendent at the center and at each end. The character of the portière may, however, be varied in many ways without departing from my invention, which is applicable to pendent rope portières generally.

A number of the inner ropes of each half of the portière, that is to say, those nearest the center, are connected by loops *i* to an eye *m* through which passes a rope or cord *n* pendent at the outer side of each half of the portière, the grip of the eye *m* upon said pendent cord *n* being sufficient to retain it in any position to which it may be adjusted thereon.

When the portière is closed the eye *m* occupies a position at or near the lower end of the pendent cord *n*, and the loops *i*, extending in graceful lines from their points of connection on the rope *a* to the eye *m*, form an additional element of attractiveness and artistic value in the portière, instead of detracting from its appearance as do the straight cords sometimes used in connection with rope portières for the purpose of drawing the opposite halves of the portière apart.

When it is desired to draw back either half of my improved portière the pendent cord *n* at that side of the portière is held at the lower end and the eye *m* is moved upward upon the cord to a greater or less extent, depending upon the extent of opening required, the use of the loops *i* resulting in a graceful draping of the portière, as will be noted on reference to Figs. 2 and 3. It is not necessary in carrying out my invention, however, that each loop shall extend from its pendent rope of the portière to the eye *m*. For instance, in Fig. 4 I have shown a construction in which each of the two pairs of loops are united in a single cord and these single cords are in turn united for connection with the eye *m*, and in Fig. 5 I have shown another construction in which a series of the pendent ropes are united by short loops *p* extending from one to the other, the last rope of the series being connected to the eye *m*. The use of the pendent cord *n*, is, however, not necessary in all cases. For instance, the independent loops may be employed in connection with a pull cord extending through an eye at the upper outer corner of the portière, the pendent cord, however, being in all cases preferred.

Another modification of this construction consists in the use of hooks along the outer rope of the portière at different distances from the top of the same, as shown in Fig. 6, these hooks being adapted for the reception of the eye *m*, or the construction may be reversed, that is to say, the hook may take the place of the eye or a series of eyes may replace the hooks, or the hooks or eyes may be upon the door frame instead of upon the portière itself.

Where it is desired to bunch the ropes which are drawn back, the pulling cord may pass through eyes upon all of the pendent ropes except the innermost one, as shown for instance in Fig. 7, so that in draping the portière the ropes are drawn successively into contact with one another as they are lifted.

Having thus described my invention, I claim and desire to secure by Letters Patent—

1. A rope portière having a series of pendent ropes, a lifting and supporting device, with independent loops united and connecting said ropes with the lifting and supporting device, substantially as described.

2. A rope portière having a series of pendent ropes, a pendent supporting cord, and a frictionally retained eye adapted to slide on said supporting cord and connected to one or more of the pendent ropes of the portière substantially as specified.

3. A rope portière in which are combined a series of pendent ropes, a supporting cord, and a frictionally retained eye adapted to slide on said cord and connected to a series of ropes of the portière by means of a series of independent loops, substantially as specified.

In testimony whereof I have signed my name to this specification in the presence of two subscribing witnesses.

GEO. F. HENSEL.

Witnesses:
 FRANK E. BECHTOLD,
 FRED BENNER.